United States Patent [19]

Nishina

[11] 4,151,653

[45] May 1, 1979

[54] MEASURING INSTRUMENT

[75] Inventor: Shingo Nishina, Kawasaki, Japan

[73] Assignee: Kabushiki Kaisha Mitutoyo Seisakusho, Tokyo, Japan

[21] Appl. No.: 844,208

[22] Filed: Oct. 21, 1977

[30] Foreign Application Priority Data

Oct. 25, 1976 [JP] Japan .............................. 51-143182[U]

[51] Int. Cl.$^2$ .......................... G01B 3/20; G01B 5/02
[52] U.S. Cl. ................................ 33/147 F; 33/143 K; 33/147 J
[58] Field of Search ............. 33/143 M, 143 J, 143 K, 33/147 F, 147 H, 147 T, 147 J, 147 K

[56] References Cited

U.S. PATENT DOCUMENTS

| | | | |
|---|---|---|---|
| 3,266,159 | 8/1966 | Scholl | 33/143 M |
| 3,273,248 | 9/1966 | Halverstadt | 33/147 T |
| 3,826,008 | 7/1974 | Nishina | 33/143 K |
| 4,063,362 | 12/1977 | Amsbury et al. | 33/147 J |

FOREIGN PATENT DOCUMENTS 1210574  2/1966  Fed. Rep. of Germany .......... 33/147 J

*Primary Examiner*—Richard R. Stearns
*Attorney, Agent, or Firm*—Brisebois & Kruger

[57] ABSTRACT

A measuring instrument in which a slider slidably attached to a main bar is urged in one sliding direction or in the opposite sliding direction by means of a spring, the urged direction of the slider being switchable, and a displacement between the jaw of the main bar and the jaw of the slider with respect to a preset reference position is displayed on a dial indicator, so that measurement of the internal dimensions as well as external dimensions can be performed under the action of a constant resilient force.

9 Claims, 4 Drawing Figures

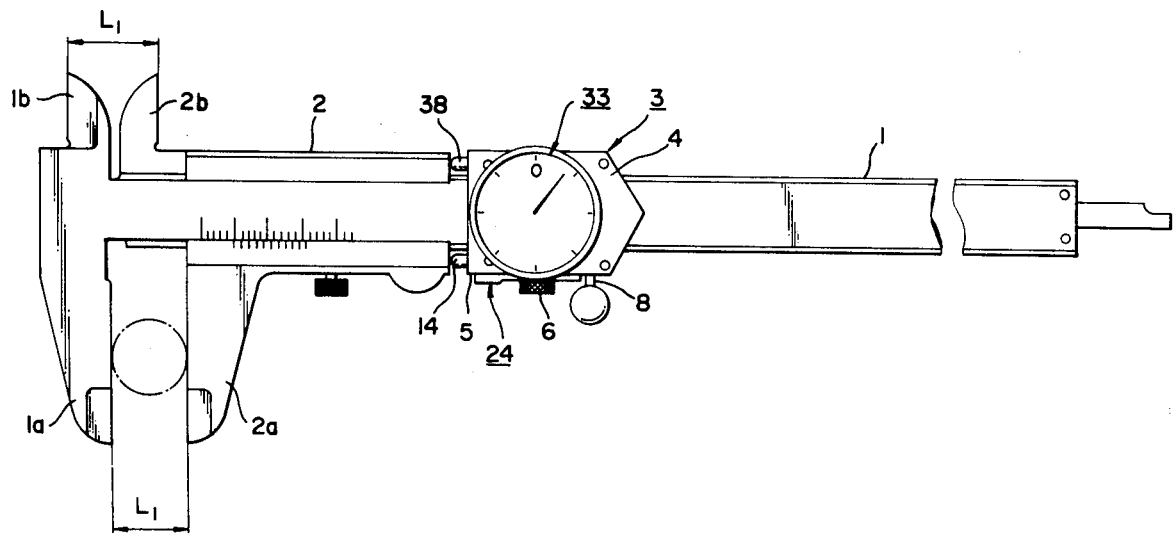

MEASURING INSTRUMENT

BACKGROUND OF THE INVENTION

The present invention relates to a measuring instrument for quickly and easily making repetitive measurements of internal dimensions as well as external dimensions.

A measuring instrument of this general type is shown in U.S. Pat. No. 3,826,008 which discloses a vernier caliper comprising a main bar or scale, a repetitive measurement operating device mounted on the main bar and adjacent to a slider, a pusher on the repetitive measurement operating device to push the slider, and a dial indicator on the repetitive measurement device to indicate the displacement of the slider when an object to be measured is held between the main bar and slider jaws and the slider is pushed by the pusher. With such vernier calipers, similar dimensions can be repetitively measured quickly and easily, but the repetitive measurements are limited to measurements of either internal dimensions only or external dimensions only.

SUMMARY OF THE INVENTION

A primary object of the present invention is to provide a measuring instrument which is capable of repetitively measuring internal dimensions as well as external dimensions by selectively switching the repetitive measuring device.

Another object of the present invention is to provide a measuring instrument that is particularly capable of repetitively measuring internal and external dimensions of similar or close sizes, quickly and easily.

Further objects, features, and advantages of the invention will become more apparent with reference to the following detailed description of the invention and the accompanying drawings.

DETAILED DESCRIPTION OF THE PREFERRED EMBODIMENT

Figure 1:
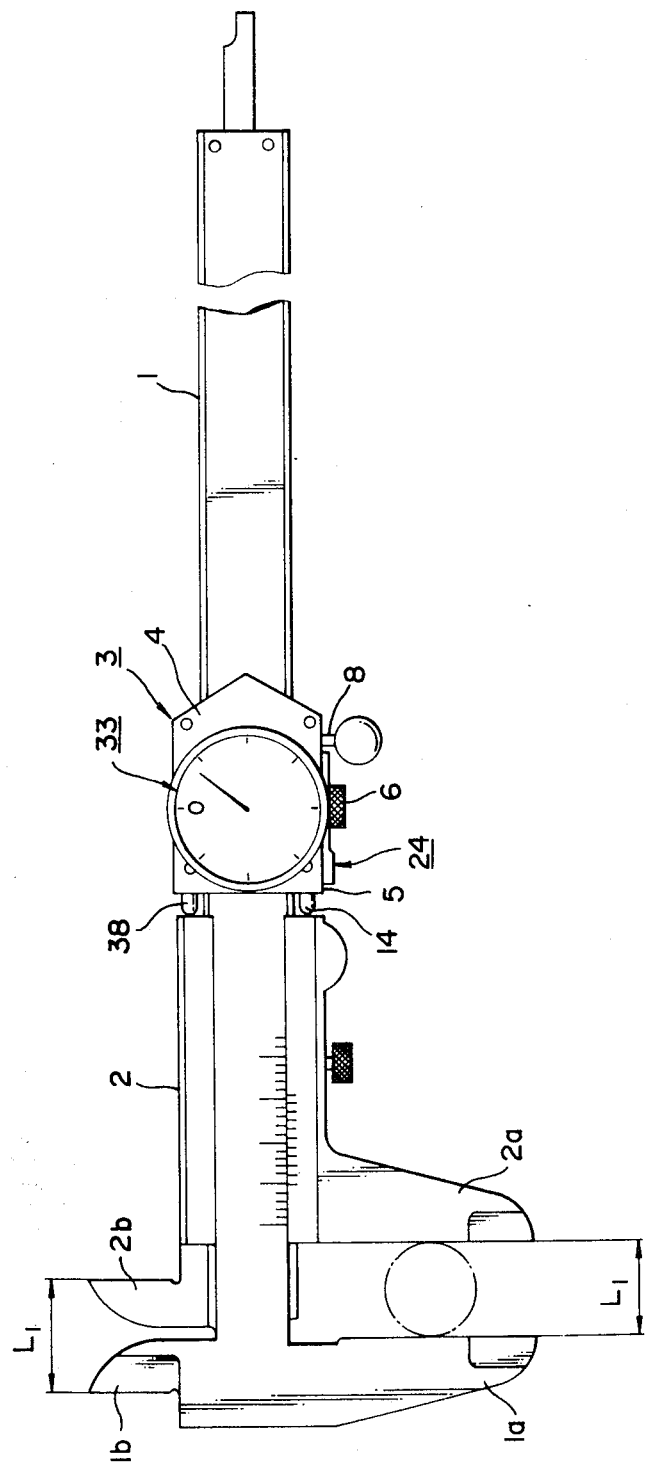
FIG. 1 is a plan view of a measuring instrument in accordance with a preferred embodiment of the present invention.

An embodiment of the present invention will now be described with reference to the accompanying drawings. First, referring to FIG. 1, the measuring instrument includes a main scale or bar 1, with a jaw 1a for external measurements and a jaw 1b for internal measurements. A slider 2 is slidably mounted on the main bar 1. Slider 2 has an external jaw 2a, and an internal jaw 2b. A repetitive measurement operating means 3 is slidably mounted on the main scale 1 and is adjacent to the slider 2.

The repetitive operating means 3, includes a support member 4 which is slidably mounted on the main bar 1. By tightening a clamping screw 6 at the center on a side 5 of the support member 4, the repetitive operating means 3 can be securely clamped to the main bar 1.

Figure 2:
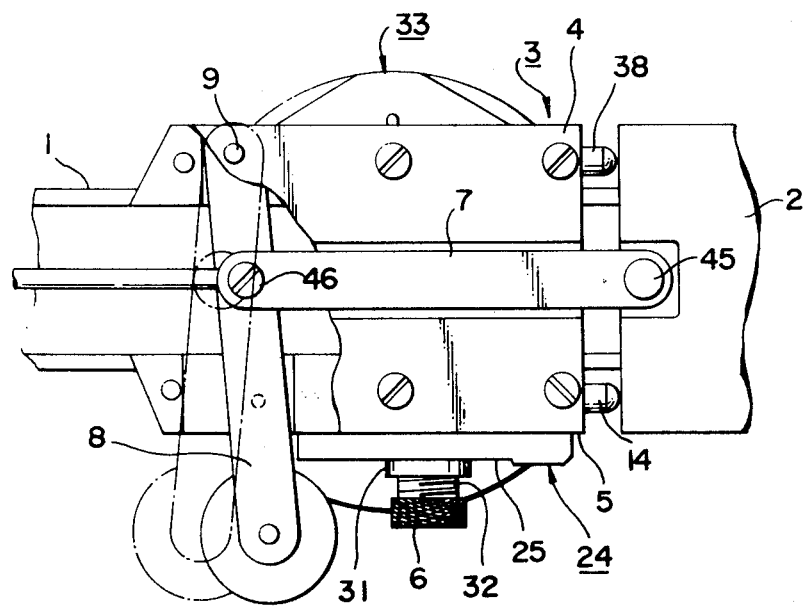
FIG. 2 is a partial bottom view on an enlarged scale of the instrument of FIG. 1, showing the repetitive measurement operating device.

As shown at FIG. 2, a connecting link 7 is located at the back side of the support member 4. One end of the connecting link 7 is pivotally attached to the slider 2 by a pivot shaft 45, and the other end of the connecting link 7 is pivotally attached to a middle part of an operating lever 8 by a pivot shaft 46. The operating lever 8 is pivotally attached at one end to the support member 4 by a pivot pin 9. Being so constructed, if the free end of the operating lever 8 is moved toward the right or left (FIG. 2), the slider 2 can be pulled toward the support member 4 or pushed away from the support member 4.

Figure 4:
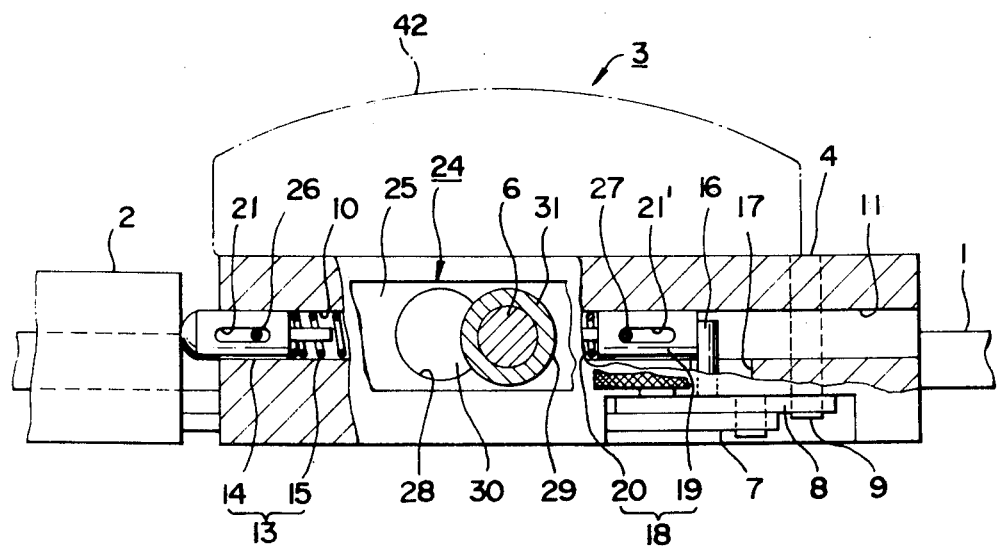
FIG. 4 is a side view of the repetitive operating means partially cut away and illustrated on an enlarged scale.
Figure 3:
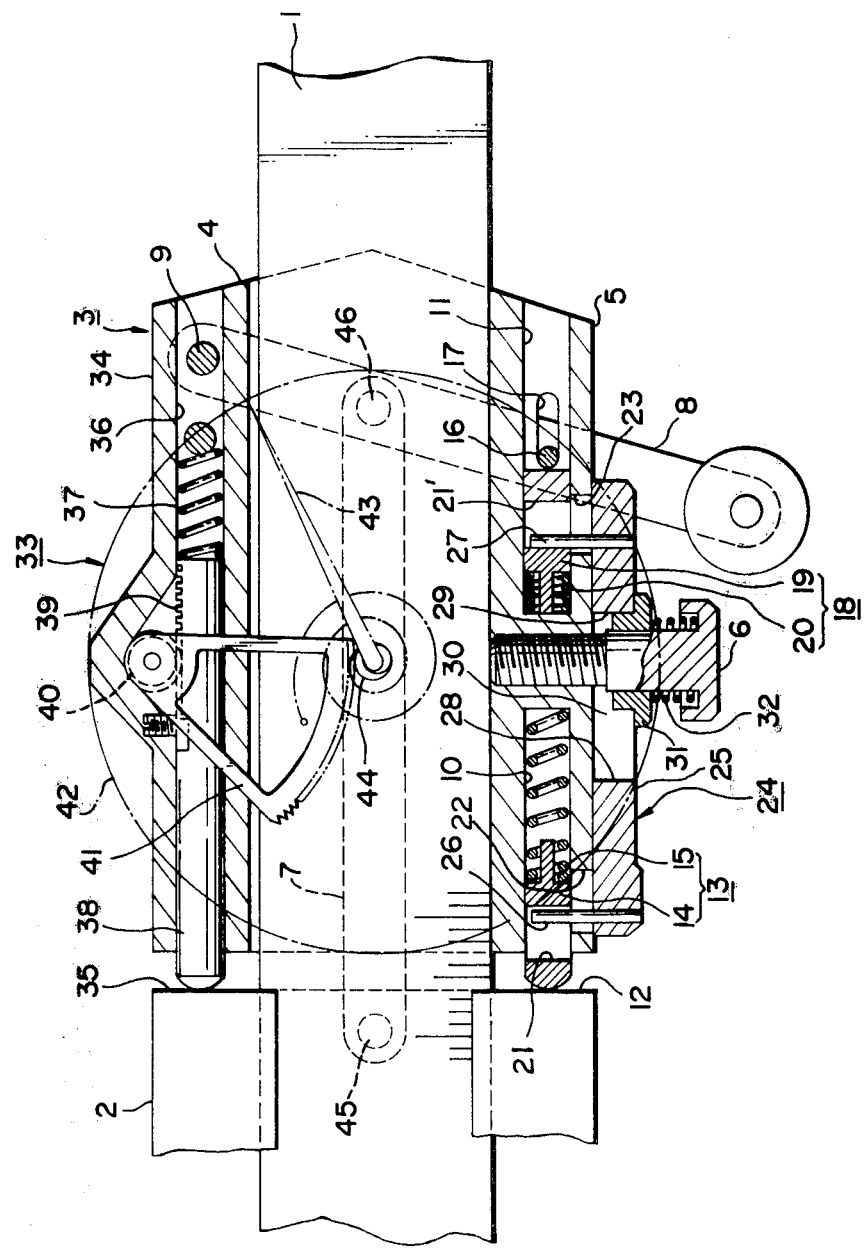
FIG. 3 is an enlarged partial view in plan, with portions cut away of the measuring instrument of FIG. 1.

With reference to FIGS. 3 and 4, two guide bores 10 and 11 are formed in one side 5 of the support member 4 and extend inwardly from opposite ends of support member 4. Guide bores 10 and 11 have their axes on the same straight line. Guide bore 10 opens toward end surface 12 of the slider 2, and in the guide bore 10 is a pusher assembly 13 which resiliently urges the slider 2 and its jaw 2a toward the jaw 1a of the main bar to take external measurements. The pusher assembly 13 is composed of a slide member or plunger 14 that is slidable in the guide bore 10, and a compression spring 15 that pushes plunger 14 outwardly of the bore 10 and toward slider 2.

A pin 16 on the operating lever 8 extends through an oblong opening 17 formed in the sidewall of bore 11. In the second guide bore 11 is a pulling assembly 18 which resiliently urges the slider 2 and its jaw 2b away from jaw 1b of the main bar 1. The pulling assembly 18 includes a second slide member or plunger 19 that is slidable in the bore 11, and a second compression spring 20 that pushes plunger 19 toward the pin 16 of operating lever 8.

Plunger 14 has between its ends, a transverse opening 21, which is elongated in the direction of movement of the plunger. Plunger 19 has a similar opening 21'. The side part 5 in which the plungers 14 and 19 slide, has elongated openings 22 and 23 respectively communicating with bores 10 and 11, and which are generally aligned with the respective openings 21, 21' when the plungers are in the working positions of FIG. 3.

Slidably mounted on the side part 5 of the support member 4 for longitudinal movement is a switching or selecting means 24 for selecting the pushing assembly 13 and disabling the pulling assembly 18, and vice versa. The switching means 24 includes a slide plate 25 equipped with parallel first and second pins 26, 27 which are fixed in and extend laterally from the opposite ends of the slide plate 25. First pin 26 extends through opening 22 and into opening 21 of plunger 14, and the second pin 27 extends through the opening 23 and into the opening 21' of the plunger 19. The openings 22 and 23 are slightly longer than the respective openings 21 and 21'.

In the slide plate 25 (FIG. 4) is an opening 30 defined by two overlapping circular holes 28 and 29 of an equal diameter, and which function as positioning locks. The width of the opening connecting circular holes 28 and 29 is slightly greater than the outer diameter of the clamp screw 6 which extends through plate 25 (FIG. 3) and is threaded through side part 5 of operating means 3. On the clamp screw 6 is a stop ring 31 having a diameter to be a close fit in the circular holes 28 and 29; the stop ring 31 being slidable along the clamp screw 6. The stop ring 31 is resiliently urged toward the plate 25 by a compression spring 32 mounted on the screw 6 and seated in a recess in the head of the screw.

The repetitive operating means 3 incorporates a dial indicator mechanism 33 for indicating the amount of displacement of the slider 2. As shown in FIG. 3, the indicator mechanism 33 includes a third guide bore 36 formed in a side part 34 of the support member 4, and which faces the end surface 35 of the slider 2, a contact pin 38 inserted in the guide bore 36 and urged by a spring 37 toward the slider 2, a rack 39 formed on one side of the contact pin 38, a gear 40 that meshes with rack 39, a sector wheel 41 fixed to gear 40 and pivotally attached to the support member 4, and a dial indicator 42 fastened to the support member 4. A gear 44 fastened to a center shaft of a needle 43 of dial indicator 42 meshes with the sector wheel 41.

With the embodiment constructed as described above, when a number of external dimensions are to be measured repetitively, between jaws 1a and 1b the distance between these jaws of the main scale 1 and the slider 2 is, first, set to a desired standard dimension $L_1$ (FIG. 1). In this jaw position, the clamping screw 6 is tightened to secure the support member 4 of the repetitive operating means 3 to the main bar 1. Dial indicator 33 is then set to zero.

The slide plate 25 of the switching means 24 is shifted to the left to the position shown in FIGS. 3 and 4 of the drawing until the stop ring 31 seats in the stop opening 29, to secure slide plate 25 to the support member 4. In this position of plate 25, plunger 19 of the pulling assembly 18 is in the leftward position shown in the drawing, being blocked by pin 27, and the spring 20 is locked in a compressed state. Therefore, the pulling assembly 18 is disabled and does not act upon the pin 16 of the operation lever 8. However, plunger 14 of the pusher assembly 13 is not blocked by pin 26, and receives the resilient force of the pushing spring 15 to press against the end surface 12 of the slider 2. Accordingly, the slider 2 and the operating lever 8 connected to the slider 2 are urged by the spring 15 to decrease the distance between jaws 1a and 2a of the main bar 1 and the slider 2.

In this external measuring state of the calipers, if the free end of the operating lever 8 is displaced to the right (FIGS. 1 and 3) to move the slider 2 to the right, and if the slider 2 is then liberated by releasing the operating lever 8 after a material or article of which external dimensions are to be measured has been interposed between the jaws 1a and 2a, the slider 2 moves to the left due to the resilient force of the spring 15 to close the jaws and hold the material to be measured between the jaws 1a and 2a. At the same time, the contact point 38 undergoes displacement following the movement of the slider 2. The displacement of the contact point 38 is converted into the rotary displacement of the needle 43, being amplified through gears 40, 41 and 44. The extent of displacement of the contact point 38 at this time represents the extent of displacement of the slider 2 with respect to the position of the slider 2 when the distance between the measuring parts is the standard dimension $L_1$.

By way of the aforesaid operation, it is possible to accurately and repetitively measure a number of external dimensions close to the standard dimension, quickly and easily, the reading appearing on the dial indicator 42.

On the other hand, when a number of internal dimensions are to be measured repetitively, the distance between the jaws 1b and 2b is set to a desired standard dimension $L_1$ in the same manner as described above, and the support member 4 of the repetitive measuring member 3 is secured to the main bar 1 by tightening the clamping screw 6.

Then, with reference to FIG. 3 and FIG. 4, the stop ring 31 is pulled out of the circular opening 29 of the plate 25 against the resilient force of the spring 32, the slide plate 25 is displaced toward the right, and then the stop ring 31 is inserted into the circular opening 28. The plunger 14 of the pusher assembly 13 is then displaced toward the right by the pin 26, and is locked with the pushing spring 15 in a compressed state. Therefore, the plunger 14 is separated from the end surface 12 of the slider 2, and no longer acts upon this end surface. The plunger 19 of the pulling means 18, on the other hand, is now released from the pin 27 and receives the resilient force from the pushing spring 20 to resiliently push the pin 16 of the operating lever 8 to the right (FIGS. 1 and 3) Therefore, the operating lever 8 via link 7 pulls the slider 2 in a direction to increase the distance between the measuring jaws 1b and 2b.

Here, if the free end of the operation lever 8 is displaced toward the left (FIGS. 1 and 3) to displace the slider 2 leftwardly in the drawing, to permit inserting the measuring jaws 1b and 2b in the inner diameter that is to be measured, and then if the slider 2 is liberated by releasing the operating lever 8, the slider 2 moves toward the right due to the resilient force of the spring 20, so that the measuring jaws 1b, 2b will come into contact with the inner diameter that is to be measured. Then, like the aforementioned measurement, the extent of displacement of the slider 2 relative to the standard dimension is displayed by needle 43 of the dial indicator.

In this manner, it is possible to accurately and repetitively measure a number of internal dimensions close to the standard dimension quickly and easily.

As will be understood from the foregoing description, the present invention is characterized by the provision of a pushing means and a pulling means that resiliently urge the slider in different sliding directions and a switching means for selecting the desired one of the two means.

As a variation of the above-described embodiment, a pushing spring and a pulling spring can act in parallel on the slider and a switching means can be provided to select the action of one of the two springs. Other variations can be made without departing from the scope of the present invention.

Due to the abovementioned construction of the present invention, it is possible to repetitively measure internal dimensions as well as external dimensions quickly and easily using a single measuring instrument by changing over the switching means. In addition, the switching operation is performed simply, by displacing the slide plate.

What is claimed is:
1. A measuring instrument comprising:
a main bar having a jaw;
a slider slidably mounted on said main bar, said slider having another jaw;
repetitive-operating means slidably mounted on said main bar and connected to said slider for operating said slider, said repetitive-operating means having a support member slidably mounted on said main bar and clamp means for clamping said support member to the main bar at a selected position along the bar;
dial indicator means mounted on said repetitive-operating means for indicating the displacement of said slider with respect to said repetitive-operating means;

pushing means cooperating with said repetitive-operating means and said slider for urging said slider in a direction away from said repetitive-operating means;

pulling means cooperating with said repetitive-operating means and said slider for urging said slider toward said repetitive-operating means; and switching means for selecting either one of said pushing means and said pulling means, said switching means comprising a slide plate slidably mounted on said support member and movable longitudinally of said main bar, a first pin on said slide plate and extending into a first longitudinally elongated opening formed in said pushing means, and a second pin on said slide plate and extending into a second longitudinally elongated opening formed in said pulling means, said slide plate being moveable between a first position in which said first pin disables said pushing means and said pulling means is operable, and a second position in which said second pin disables said pushing means and said pulling means is operable, and a resiliently urged stop ring on said clamp means for locking said slide plate in either one of said two positions.

2. A measuring instrument as set forth in claim 1, wherein said pushing means comprises a first plunger slidable in a first guide hole formed in the repetitive-operating means and which opens toward the slider, and a first spring urging said first plunger toward said slider, and said pulling means comprises a second plunger slidable in a second guide hole formed in said repetitive-operating means, and a second spring urging the second plunger away from said slider.

3. A measuring instrument as set forth in claim 2, wherein the repetitive-operating means includes an operating lever one end of which is pivotally attached to said support member, means on said operating lever engaging said second plunger, and a connecting link having one end pivotally attached to the middle part of said operating lever, and its other end pivotally attached to the slider.

4. A measuring instrument as set forth in claim 2, wherein the first guide hole and the second guide hole are axially aligned.

5. A measuring instrument as set forth in claim 2, wherein said repetitive-operating means has a third guide hole facing the slider, and said dial indicator mechanism comprises a pushing rod inserted in said third guide hole and urged toward the slider by a pushing spring, a gear rack on said pushing rod, a gear engaged with said rack, and an indicator needle connected to said gear.

6. A measuring instrument according to claim 1 wherein, said clamp means comprises a clamp screw threaded into the support member and extending through the slide plate.

7. A measuring instrument as set forth in claim 6, wherein said slide plate has first and second overlapping circular holes, joining each other at the overlapping region to provide a space, said space being greater than the diameter of the clamp screw, said stop ring on said clamp screw being movable between locked positions in said respective holes and an unlocked position out of said holes, and being urged toward the locked position.

8. A measuring instrument as set forth in claim 1, wherein said pins on the slide plate extend through pin receiving openings formed in said support member.

9. A measuring instrument as set forth in claim 8, wherein each pin receiving opening of said support member is elongated in the sliding direction of the slider.

* * * * *